United States Patent [19]

Wingerden

[11] E Patent Number: Re. 32,808

[45] Reissued Date of Patent: Dec. 27, 1988

[54] PLANT PROPAGATING CONTAINER AND METHOD

[76] Inventor: Aart V. Wingerden, Hwy. 191, Rte. 1, Box 74A, Horse Shoe, N.C. 28742

[21] Appl. No.: 872,140

[22] Filed: Jun. 9, 1986

Related U.S. Patent Documents

Reissue of:

[64] Patent No.: 4,453,344
Issued: Jun. 12, 1984
Appl. No.: 520,758
Filed: Aug. 8, 1983

U.S. Applications:

[63] Continuation of Ser. No. 279,626, Jul. 1, 1981, abandoned.

[51] Int. Cl.[4] ..... A01G 9/02

[52] U.S. Cl. ..... 47/85; 47/58; 47/77

[58] Field of Search ..... 47/85

[56] References Cited

U.S. PATENT DOCUMENTS

| | | | |
|---|---|---|---|
| 1,169,674 | 1/1916 | Pelton | 47/85 |
| 2,870,575 | 1/1959 | Weber | 47/85 |
| 2,944,696 | 7/1960 | Effgen | 220/22 |
| 3,447,261 | 6/1966 | Hundt | 47/77 |
| 3,557,489 | 1/1971 | Ferrand | 47/87 |
| 3,667,159 | 6/1972 | Todd | 47/87 |
| 3,788,002 | 1/1974 | Suchka | 47/85 |
| 3,834,074 | 9/1974 | Shirouzu | 47/85 |
| 4,050,188 | 9/1977 | Van Wingerden | 47/85 |
| 4,312,152 | 1/1982 | Drury et al. | 47/63 X |

FOREIGN PATENT DOCUMENTS

| | | | |
|---|---|---|---|
| 547667 | 4/1932 | Fed. Rep. of Germany . | |
| 2362457 | 7/1974 | Fed. Rep. of Germany | 47/85 |
| 1307886 | 9/1962 | France . | |
| 183928 | 5/1936 | Switzerland | 47/85 |
| 493730 | 10/1938 | United Kingdom | 47/85 |

*Primary Examiner*—Robert E. Bagwill
*Attorney, Agent, or Firm*—David M. Carter

[57] ABSTRACT

A seedling growing container is illustrated wherein a number of removable partitions or barriers are positioned together in a block. Each of the partitions has interconnected diverging walls forming a series of troughs therebetween open at the top and the bottom so that the partitions may be placed in opposing relation as in a tray forming growing compartments from each of the opposing troughs which are in register with each other, suitable for growing a single seedling. Positioning of the plugs is contemplated such that alternate rows of plugs of growing material, each of which is capable of growing a single seedling, are utilized so that each plug will be surrounded for the most part by a partition with the remainder being surrounded by an air space for preventing roots from growing from one plug to the other through the process of air pruning. The tray is partially open at the bottom, at least to an extent sufficient to provide an opening for heated air to be passed upwardly through the voids formed by the omitted plugs for further encouraging growth of the seedlings. Any suitable means may be utilized for positioning the partition together to form a block.

14 Claims, 4 Drawing Sheets

PLANT PROPAGATING CONTAINER AND METHOD

Matter enclosed in heavy brackets [ ] appears in the original patent but forms no part of this reissue specification; matter printed in italics indicates the additions made by reissue.

BACKGROUND OF THE INVENTION

This is a continuation of application Ser. No. 279,626, filed July 1, 1981, now abandoned.

The most widely used type of seedling tray now on the market is exemplified by the disclosure of U.S. Pat. No. 3,667,159. The tray of this patent possesses disadvantages in that removal of the plugs and seedings from the tray results in varying degrees of plant shock whether or not the seedling is simply pulled out from the top or poked out from the bottom, or whether the tray is partially turned over to facilitate jarring the seedlings loose. All such shocks to the plant are detrimental to further growth, and it is an important object of the present invention to provide a seedling tray and the like wherein removable partitions may be pulled away one at a time to permit the plants to easily be removed or fall out from the confinement between a pair of diverging walls of the partitions.

This invention is an improvement upon the seedling tray illustrated in U.S. Pat. No. 4,050,188. France Pat. No. 1,307,886, dated Sept. 17, 1962, illustrates the use of partitions, but the rows thereof are joined at the bottom and the bottom portions are hinged to adjoining bottom portions. No provision is made for air to pass upwardly through the bottoms or for removal of the partitions. The roots of adjoining plants may grow together as is common to the prior art.

Other patents, which are illustrative of the state of the art, include U.S. Pat. Nos. 2,870,575; 2,944,696, 3,447,261; 3,513,594; 3,557,489; 3,667,159; 3,788,002; German Pat. No. 547,677 and German Pat. No. 2,362,457.

SUMMARY OF THE INVENTION

The invention contemplates the use of a number of partitions having diverging interconnected walls which may be placed into opposing relation each to the other for forming a plug compartment, open on each end so as to have a substantially fully open top and bottom by reason of the fact that the vertical troughs between the diverging walls are in registry with each other. The partitions are positioned together in opposed relation to form a block for accommdating plugs for growing seedlings. It has been found that it is possible to omit plugs of growing material from certain compartments in order to provide rows extending diagonally, perpendicularly or otherwise across the trays so as to provide air pruning at all contact point junctures between compartments wherein the roots might grow from one adjoining plug to another. The plug system of the present invention is one which is commonly employed and wherein efforts have long been made to facilitate their use with easy removal from the growing container without the introduction of plant shock to the root systems of the seedlings. Not only has this been accomplished in such a way to facilitate future plant growth, but the maturity of the seedlings themselves in the tray is advanced by reason of introducing air upwardly through the trays while suitably supported in order to promote growth and development of the seedlings. It is possible that flow of Heated air may be induced as illustrated, or carbon dioxide may be added to the air flow permitted between plugs in order to further enhance growth. Since the partitions are constructed of preferably integral molded plastic which should be relatively stiff, each of the diverging walls is illustrated as being bridged by a longitudinally aligned flat member which will oppose comparable flats on opposing partitions to prevent sliding of the partitions laterally and inwardly because either such motion would result in injury to the root systems. Since the trays may be slidable with respect to each other and the plugs readily dislodged, each may be readily removed for dislodging the plants grown therein. Thus, the problem persisting in the art of the roots growing together has been overcome by the provision of the apparatus illustrated herein.

As a result of the air pruning due to the open bottom and open adjacent compartment, the roots tend to grow downwardly and when replanting occurs this tendency will continue because the roots will not have become disoriented through growing out at the bottom or sides through contact points into adjacent compartments. Air movement is permitted around the individual seedlings from the bottom up for facilitating growth and heated or cooled air flow may be induced, and if desired carbon dioxide may be included for producing stronger plants. By using warm air from the top, energy is saved. It is important to note also that the soil can be adjusted to meet the needs of a particular plant and a relatively high or low plug can be utilized as needed. Moreover, the soil is where it needs to be since it may be evenly distributed from top to bottom. This is permitted because the partitions may be moved outwardly for removal of the plugs, and it is not necessary to grow the plugs into a downwardly tapering arrangement in order to facilitate removal. Where such downwardly tapering plugs are employed, as in some of the prior art trays wherein the plugs are to be poked out from the bottom, there is a deficiency of soil which inhibits root growth at the bottom where growth should be more pronounced.

There is no adhesion of the plugs to the sides so that there is no damage to the plugs when the partitions are removed. It has been found possible to place the planting material within the compartments in such a way that no other containers are needed when partitions are positioned to form a block as described herein.

Perhaps most important of all, the plants are separated in a horizontal direction thus making mechanical transplanting possible. The strips can be packaged in small stacks which fit together to facilitate shipping.

BRIEF DESCRIPTION OF THE DRAWINGS

The construction designed to carry out the invention will be herein after described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
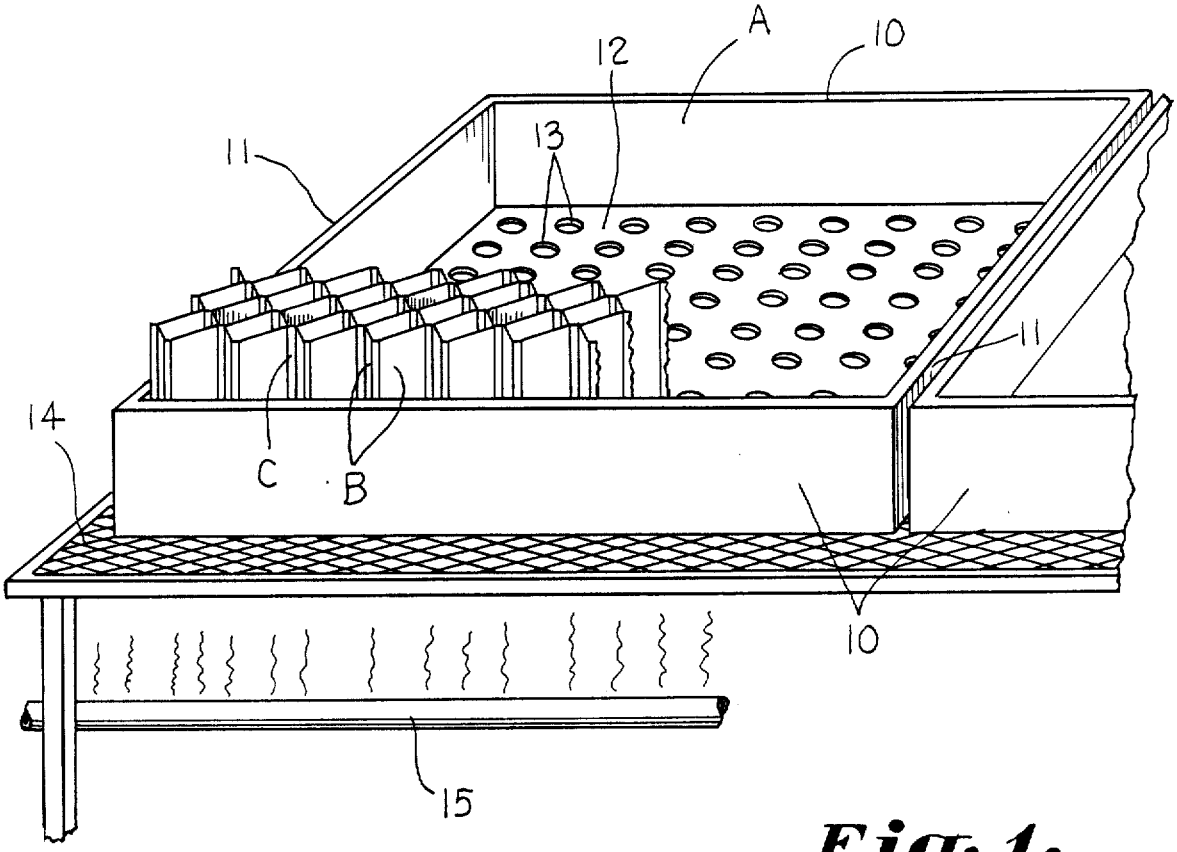
FIG. 1 is a perspective view illustrating a tray having a partially open bottom for receiving opposed partitions having diverging walls forming troughs therebetween which are in register with each other so that opposing troughs form compartments for holding respective plant growing material for seedlings in a plug arrangement.

A seedling growing container is illustrated including a tray A having sides and a bottom with openings extending thereacross. Alternative means other than the tray are illustrated for positioning the partitions in a block as contemplated herein. A plurality of removable partitions are provided wherein each of the partitions includes a series of interconnected diverging walls B forming a trough between adjacent walls. The partitions are generally sinuous as illustrated in the drawings. The partitions are removably positionable with troughs of adjacent partitions in opposed relation forming respective growing compartments each suitable for growing a single seedling. Adjacent interconnected diverging walls of each of the partitions are bridged by a wall C extending longitudinally of the partition and which acts as a contact point with a similar wall on an adjacent partition.

FIG. 1 illustrates a tray A having a partially open bottom. The tray may be molded in one piece of suitable plastic as may the partitions which are to be received within the tray. The tray A is illustrated as having sides which preferably include elongated opposed wall members 10 and end members 11 bridging therebetween. The bottom may be a partially open member illustrated at 12 which includes a number of perforations 13, or the bottom may be formed from a series of spaced ledges or bridging members in any suitable fashion for permitting drainage and air flow upwardly therethrough from the bottom while supporting the partitions, or the tray may have no bottom at all. As illustrated in FIG. 1, the tray is illustrated as being positioned upon a table having a top constructed of expanded metal 14 which permits the upward flow of heated air as from suitable standard steel hot water pipes 15. The air flow is upwardly through the foraminous table and through the openings 13 in the bottom of the tray. An opening 13 is illustrated as being provided for each of the cellular compartments described as being formed by opposed troughs formed within the partitions.

Figure 2:
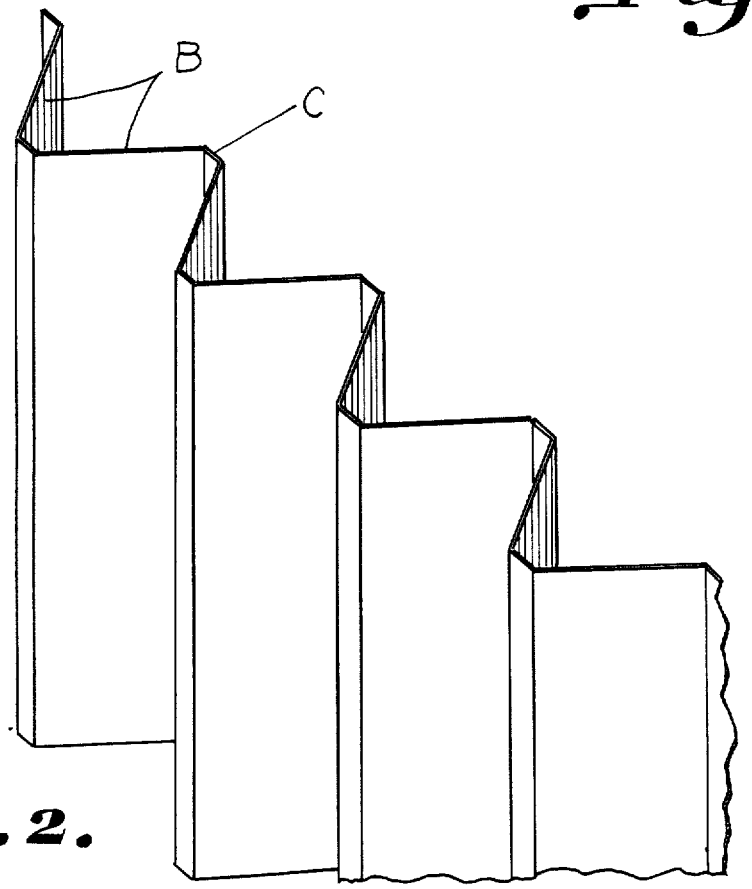
FIG. 2 illustrates a partition which is preferably constructed entirely of relatively stiff plastic material being molded so as to have longitudinally aligned flats at contact points for bridging and interconnecting the diverging walls which preferably diverge at an angle of about 90 degrees.
Figure 3:
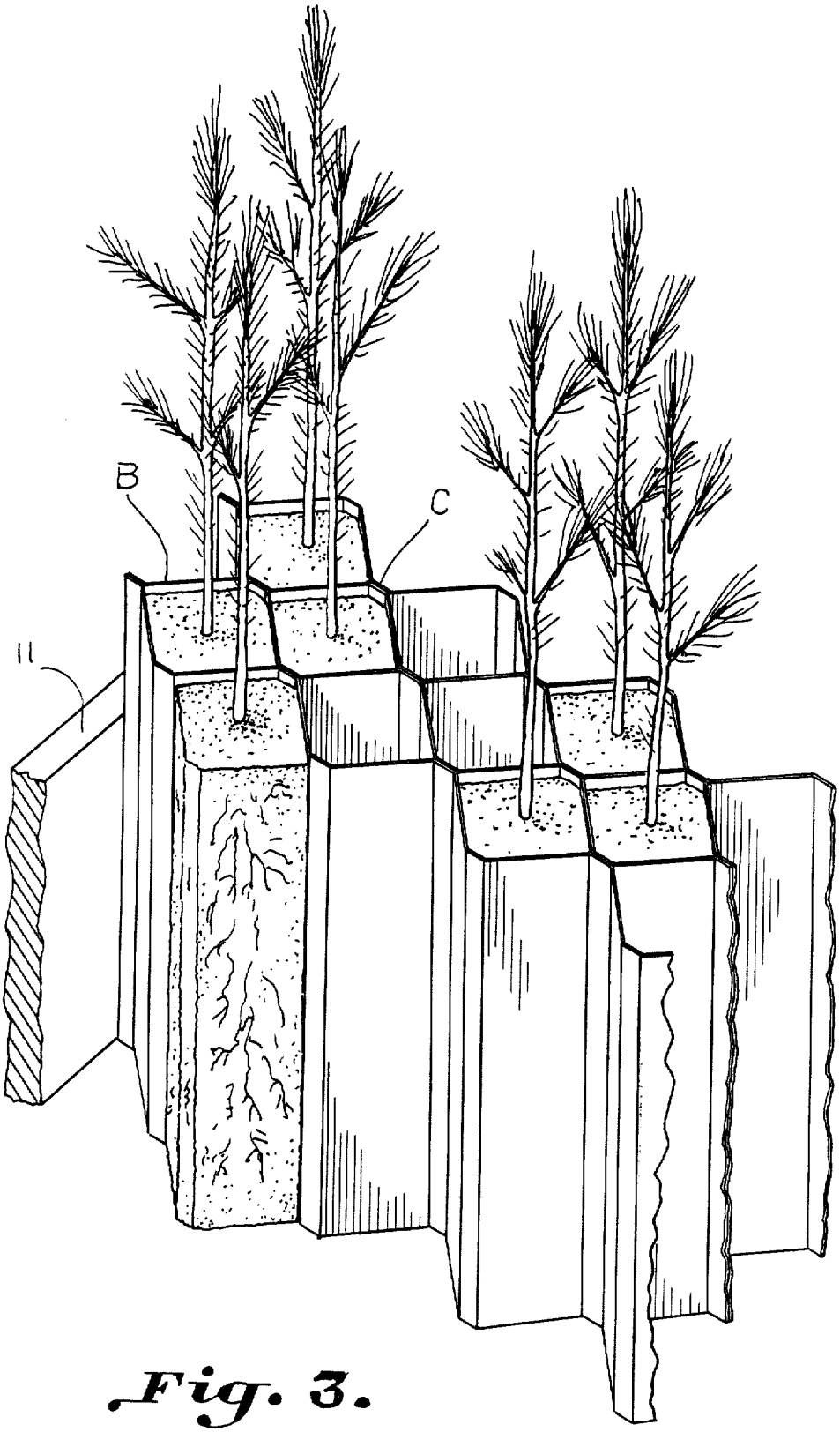
FIG. 3 is a perspective view illustrating seedling plugs with a partition removed showing the fashion in which the plugs may be dislodged from a remaining partition.

FIG. 2 illustrates a partition in which the diverging walls are designated at B. The walls are joined by flats or bridging portions C which are aligned diagonally to be in register with an opposing flat as best illustrated in FIG. 3. These flats permit a tight and stable positioning of the partitions within the trays. The partitions thus by being positioned firmly together, avoid sliding in either longitudinal direction while preventing the growth material from being forced together by inward movement of the partitions in such a way as to crush the growing material and root system contained therein. The walls B preferably diverge at an angle of approximately 90 degrees so as to avoid restricted corners which may tend to restrict the free removal of the plugs and plants after removal of the opposing partitions. After removal of the adjacent partitions the plugs will simply fall out or away from the next partition.

FIG. 3 illustrates a partition or barrier which may be taller than the sides of the trays as in this instance, the seedlings are tree seedlings and compartments for the plugs are relatively tall to accommodate the extensive root systems involved. It is contemplated that such partitions may be approximately five inches tall, whereas for bedding plants, the partitions may not be more than approximately one-half inch tall with a similar height for the sides of the tray. As illustrated in FIG. 3, the forwardmost partitions may be removed by sliding same upwardly permitting easy dislodgement of seedlings contained within the plugs of growing material in position between diverging walls of the next adjacent tray.

Figure 4:
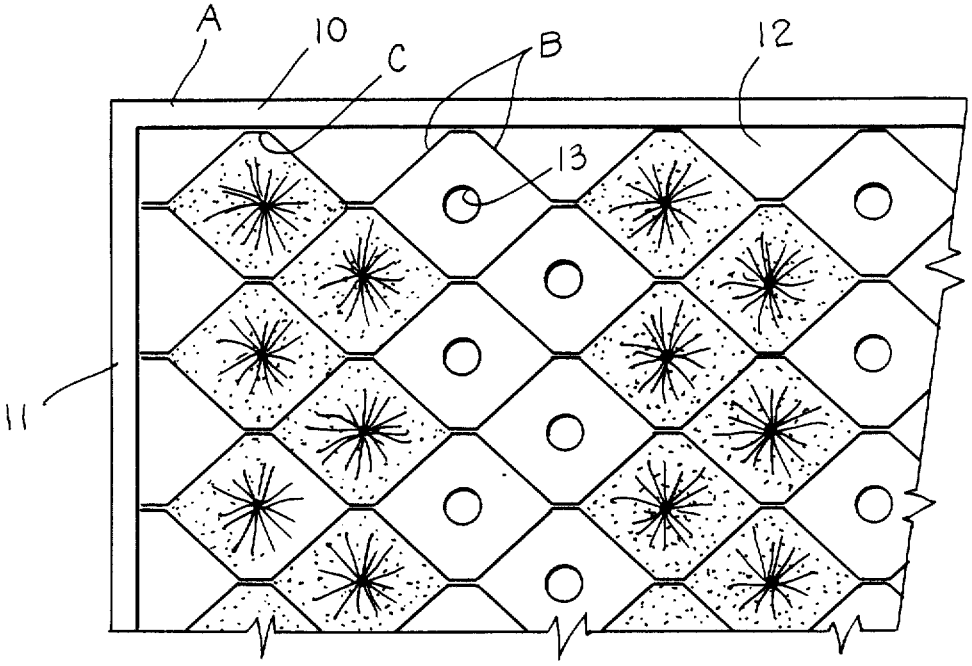
FIG. 4 is a schematic plan view further illustrating the honeycomb arrangement formed by the various partitions wherein every other cavity is maintained free of plant growing material so as to provide air pruning in areas which are not entirely shielded by imperforated partition material.
Figure 4A:
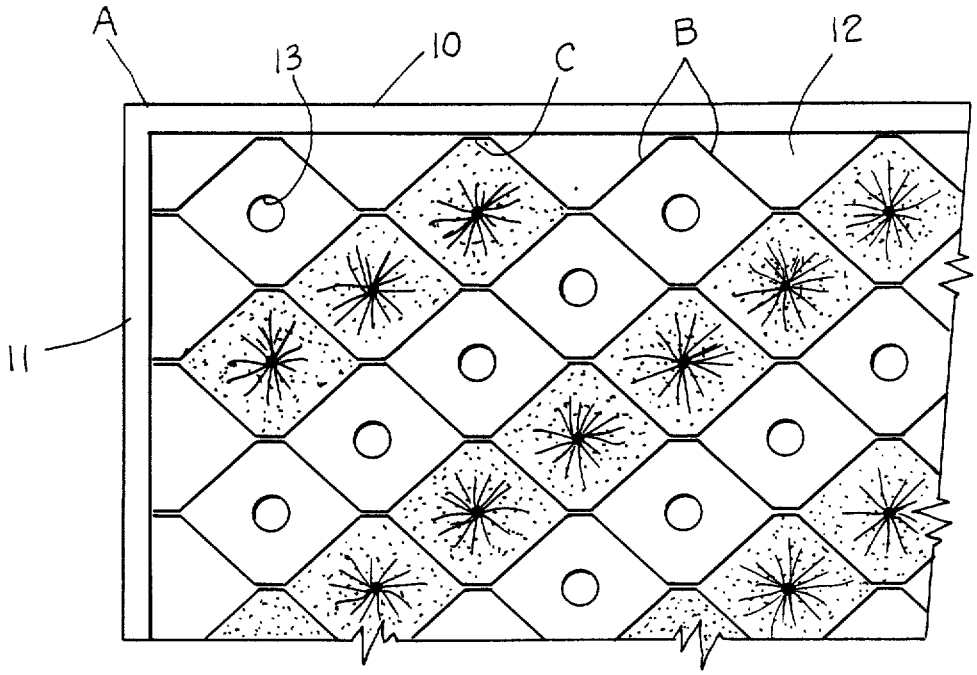
FIG. 4A is a schematic plan view illustrating a modified form of the invention of FIG. 4 showing another pattern of plug distribution assuring air pruning.

FIG. 4 illustrates a planting arrangement wherein pairs of rows extending at right angles across the longitudinally positioned partitions are left open to provide air pruning at the contact points. Thus, two transverse rows of seedlings may be planted. Another possible alternate arrangement is illustrated in FIG 4A wherein alternate diagonal rows of cells or compartments are left open to provide air pruning at contact points. It will be observed that no longitudinally adjoined compartments separated only by opposed flats (contact points) are permitted, as it is at these exposed points that the roots would otherwise grow between adjoining plugs. By leaving these compartments open, air pruning is permitted and at the same time the flow of warm air permitted to flow through the bottom upwardly therethrough to promote growth of the seedlings.

Thus, the method of propagating seedlings contemplates positioning a number of oppposed elongated removable generally sinuous barriers each having adjacent integrally interconnected diverging walls forming spaced troughs which are in opposed relation with troughs of adjacent barriers to contain respective plugs so as to form a barrier between respective plugs while positioning a series of spaced plugs of growing material aligned in one direction along said barriers. Adjacent barriers contact one another at contact points on either side of each trough. Additional opposed removable barriers are positioned forming a number of series of plugs in another direction across said barriers. The plugs are arranged in each of the plurality of series with the plugs of an adjacent of said plurality of series as to form alternate rows of plugs wherein each plug is separated from adjacent plugs on each side either by barriers and contact points which communicate with an air space.

Preferably, the partitions are integrally constructed of relatively stiff plastic material so as to promote sliding and for easy removal to facilitate exposure of the next layer of plugs to facilitate their removal. The compartments formed thereby are relatively stable promoting plugs of uniform size to provide adequate root formation to facilitate planting after suitable development of seedlings which may be advanced by exposure to warm air from the bottom of the container.

Figure 5:
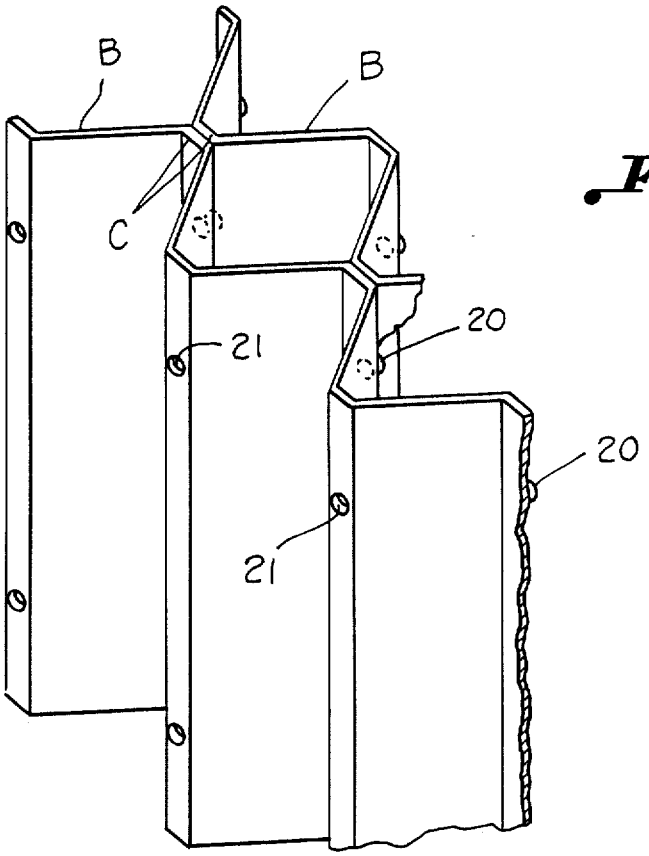
FIG. 5 is a perspective view illustrating a partition having means positioning such partitions in a block according to a modified form of the invention.

FIG. 5 illustrates the use of fastening means carried by the partitions for joining several of them in opposed relation as a block. The fastening means are illustrated as being of the Leggo variety wherein an insertable member 20 is in interlocking relation with a receptacle 21. Preferably, the interlocking fastening means are carried by the opposed wall portions of the partitions and more than one fastener may be carried per wall. Several walls across the block may be equipped with fasteners.

The fasteners are thus preferably of some interlocking variety as opposed to glue and the like, although such may prove satisfactory. Separable fasteners may be utilized and positioned as required to fasten the partitions in such a way as to provide for stable positioning of the plugs of growing medium. The partitions may then be bound, fastened or otherwise positioned together for raising the seedlings and to permit easy freeing thereof once they are grown.

Figure 6:
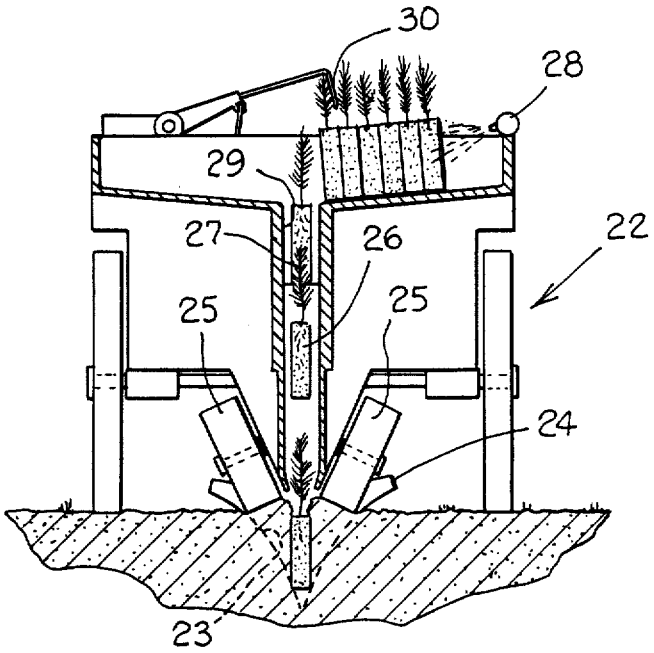
FIG. 6 is a schematic rear elevation illustrating a planting apparatus utilizing a block of seedlings in accordance with the invention.

FIG. 6 illustrates an apparatus for planting seedlings broadly designated at 22. A furrow 23 is formed in the earth as by a suitable plow attachment 24 and the wheels 25 compact earth about the plugs 26 carrying seedlings having tops 27. If desired, the seedlings may be washed with water from a pipe 28 into the opening 29 for facilitating automated planting or transplanting. Suitable pins 30 and the like may be inserted automatically or manually successively behind respective partitions for freeing and removing the plugs from a block of partitions. The plugs are then free for planting as described above.

It is thus seen that by mechanically or manually separating the partitions from the plugs, it is possible to utilize total mechanical planting. This makes it possible to sow a crop utilizing the seedlings rather than seeds in areas where there would otherwise be too few frost-free days to permit such a crop were it necessary to use seeds. In other words, by utilizing seedlings, the time required for the germination of seeds is avoided so that a greater variety of crops are permitted in a given growing area, particularly in instances where there would be otherwise too few frost-free days.

While a preferred embodiment of the invention has been described using specific terms, such description is for illustrative purposes only, and it is to be understood that changes and variations may be made without departing from the spirit or scope of the following claims.

What is claimed is:

1. A [seedling] *plant* growing container comprising:

a plurality of removable partitions each partition integrally formed of stiff, bridging material;

each of said partitions being generally sinuous and defining a series of generally outwardly diverging walls connected on adjacent ends forming a plurality of spaced troughs;

said partitions being positioned to form a block with troughs of adjacent partitions in opposed relation and with adjacent partitions having contact points on either side of each said adjoining trough to form respective growing compartments with alternate empty compartments therebetween to provide for air pruning at said contact points, alternating compartments being suitable for growing a single [seedling] *plant;* a tray having open bottom portions providing support means removably positioning said partitions; and each of said partitions being of such length as to extend across said tray for support adjacent opposite ends thereof; there being [seedling] *plant* plugs in said growing compartments such that no two plugs are adjacent the same contact point and such that all plugs within each of said growing compartments are encompassed by a barrier and a contact point which communicates with air for air pruning at the contact point.

2. The structure set forth in claim 1 wherein adjacent diverging walls of each of said partitions are bridged by a wall extending longitudinally of said partition to form a contact point.

3. The structure set forth in claim 2 including interlocking fastening means carried by respective partitions for removably positioning said partitions to form a block.

4. The structure set forth in claim 3 wherein said interlocking fastening means are carried by opposed walls of respective partitions.

5. The structure set forth in claim 1 including means removably positioning said partitions to form a block.

6. The structure set forth in claim 5 wherein said means removably positioning said partitions comprises a tray having an open bottom.

7. A plurality of generally sinuous partitions, each integrally formed of stiff bridging material, forming a [seedling] *plant* growing container, each partition comprising:

a series of interconnected diverging walls forming a series of troughs open on each end;

each of said troughs being formed by an adjacent pair of interconnected diverging walls;

each of said partitions being movably positionable with respective troughs of an opposed partition in registry with each of said troughs and with adjacent partitions having contact points on either side of opposed troughs forming respective growing compartments suitable for growing a single [seedling] *plant;* adjacent interconnected diverging walls each being integrally formed and joined by a bridging wall extending therebetween longitudinally of respective partitions said bridging walls of one partition contacting bridging walls of adjacent partitions to form said contact points; and fastening means carried by respective opposed bridging walls for removably joining said partitions to form a block; there being [seedling] *plant* plugs in said growing compartments such that no two plugs are adjacent the same contact point and such that all plugs within each of said growing compartments are encompassed by a barrier and a contact point which communicates with air for air pruning at the contact point.

8. The structure set forth in claim 7 wherein adjacent diverging walls are bridged by a wall extending longitudinally to form a contact point, and wherein said diverging walls form an angle between them of about 90 degrees more or less.

9. The methd of propagating [seedlings] *plants* comprising the steps of:

positioning a plurality of opposed elongated removable generally sinuous barriers extending in one direction each having adjacent integrally interconnected diverging walls forming spaced troughs which are in opposed relation with troughs of adjacent barriers and with adjacent barriers having contact points on either side of opposed troughs to define a plurality of volumes for [seedling] *plant* plugs; arranging [seedling] *plant* plugs in said volumes such that no two plugs are adjacent the same contact point and such that all plugs within each of said volumes are encompassed by a barrier and a contact point which communicates with air for air pruning at the contact point.

10. The method set forth in claim 9 including arranging adjacent walls of said barriers so as to diverge at an angle of about 90 degrees.

*11. The method of propagating plants comprising the steps of:*

*positioning a plurality of opposed elongated removable barriers extending in one direction each having adjacent integrally interconnected walls forming spaced troughs and with adjacent barriers having contact points to define a plurality of volumes for plant plugs;*

*arranging plant plugs in said volumes such that no two plugs are adjacent the same contact point and such that all plugs within each of said volumes are encompassed by a barrier and a contact point which communicates with air for air pruning at the contact point.*

*12. The method of claim 11 further including the step of moving air upwardly past said barriers.*

*13. A block of interconnected space compartments for propagating plants having tops and root plugs including a plurality of opposed strips constructed of flat plastic material forming respective rows of space compartments, each strip comprising:*

*a plurality of spaced channels for forming with corresponding channels of an opposed strip a row of compartments,*

*a plurality of spaced connecting members joining adjacent channels in each strip;*

*said connecting members each further extending into engagement with a strip of the next row of compartments for spacing said strips;*

*a plurality of plants having root plugs contained in some of said spaced compartments; other of said space compartments being empty and defining open channels enabling air to move through said block.*

*14. An apparatus for growing plants comprising:*

*a plurality of interconnected hollow compartments: said compartments being open on both ends; a predetermined number of said compartments containing a growing medium; said compartments containing growing medium also containing said plants; a predetermined number of said compartments being open providing ventilation to said plants, whereby said interconnections are so constructed and the arrangement of said compartments containing growing medium and open compartments is such that air can move vertically substantially surrounding each of said plants.*

* * * * *